(12) United States Patent
Chung et al.

(10) Patent No.: US 7,046,070 B2
(45) Date of Patent: May 16, 2006

(54) LVDS SWITCH CONTROL DEVICE FOR A PORTABLE APPARATUS

(75) Inventors: Show-Nan Chung, Sinjhuang (TW); Chin-Peng Tsai, Sindian (TW); Chun-Chang Chen, Taipei (TW)

(73) Assignee: Tatung Co., Ltd., Taipei (TW)

( * ) Notice: Subject to any disclaimer, the term of this patent is extended or adjusted under 35 U.S.C. 154(b) by 337 days.

(21) Appl. No.: 10/758,230

(22) Filed: Jan. 16, 2004

(65) Prior Publication Data

US 2004/0189683 A1 Sep. 30, 2004

(30) Foreign Application Priority Data

Jan. 20, 2003 (TW) .............................. 92200992 U

(51) Int. Cl.
*H03K 17/62* (2006.01)

(52) U.S. Cl. ...................................... 327/403; 327/108
(58) Field of Classification Search ................ 327/108, 327/109, 110, 111, 403, 404, 405, 407, 408, 327/411
See application file for complete search history.

(56) References Cited

U.S. PATENT DOCUMENTS 5,987,543 A * 11/1999 Smith .......................... 710/70
6,864,891 B1 * 3/2005 Myers ......................... 345/502

* cited by examiner

*Primary Examiner*—Jeffrey Zweizig
(74) *Attorney, Agent, or Firm*—Bacon & Thomas, PLLC

(57) ABSTRACT

An LVDS switch control device for a portable apparatus is disclosed, which has an LVDS transducer, which transforms the image information for the portable apparatus into LVDS signals; a buffer receiving the LVDS signals transmitted by the connection pedestal as the portable apparatus is assembled on the connection pedestal; a detector producing a correct assembling signal as the portable apparatus is correctly assembled on the connection pedestal; and an LVDS switcher having a first input end, a second input end and an output end, wherein the first input end connects with the detector. When the detector produces the correct assembling signal, the output end of the LVDS switcher will produce a signal that disables the LVDS transducer and enables the buffer so that the LVDS signals outputted by the connection pedestal will be transmitted to a display panel of the portable apparatus.

4 Claims, 3 Drawing Sheets

LVDS SWITCH CONTROL DEVICE FOR A PORTABLE APPARATUS

BACKGROUND OF THE INVENTION

1. Field of the Invention

The present invention relates to a technique field of the connection pedestal for a portable apparatus and, more particularly, to an LVDS (low voltage differential signaling) switch control device for a portable apparatus.

2. Description of Related Art

Owing to great progress in electrical technology, most electronic products, e.g. portable apparatuses such as palm computers, personal digital assistants (PDA), and tablet PCs, have become more and more user friendly so as to facilitate the application by users. In most cases, portable apparatuses are mounted on a charging-pedestal when they need to be recharged. As shown in FIG. 1, a connector 11 is mounted on a portable apparatus 10 for connecting the portable apparatus 10 with a connection pedestal 20, which may transmit signals to the portable apparatus 10 or provide power to charge the rechargeable battery of the portable apparatus 10. Moreover, the main computer 30 may transmit the display information to the portable apparatus 10 through an RF module. However, the bandwidth provided by the RF module is usually not broad enough for transmitting a general stream of video/sound signals (e.g. signals of MPEG 2 format). As a result, the display information or the stream of video/sound signals cannot be shown completely and smoothly on the display panel of the portable apparatus 10.

Therefore, it is desirable to provide an improved LVDS switch control device for a portable apparatus to mitigate and/or obviate the aforementioned problems.

SUMMARY OF THE INVENTION

The object of the present invention is to provide an LVDS switch control device for a portable apparatus so that the portable apparatus can receive the LVDS signals transmitted from a connection pedestal when the portable apparatus is correctly inserted, mounted or assembled on the connection pedestal, and thereby the image information can be shown completely on the display panel of the portable apparatus.

To achieve the object, the LVDS switch control device for a portable apparatus of the present invention includes an LVDS transducer, a buffer, a detector, and an LVDS switcher. The LVDS transducer transforms the image information for the portable apparatus into LVDS signals. The buffer prevents the impedance matching problem caused by too long a distance between the LVDS transducer and a connection pedestal as the portable apparatus is not assembled on the connection pedestal, and receives the LVDS signals transmitted by the connection pedestal as the portable apparatus is assembled on the connection pedestal. The detector produces a correct assembling signal as the portable apparatus is correctly assembled on the connection pedestal. The LVDS switcher has a first input end, a second input end and an output end. The first input end connects the detector. Moreover, when the detector produces the correct assembling signal, the output end of the LVDS switcher produces a signal that disables the LVDS transducer and enables the buffer so that the LVDS signals outputted by the connection pedestal are transmitted to a display panel of the portable apparatus.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
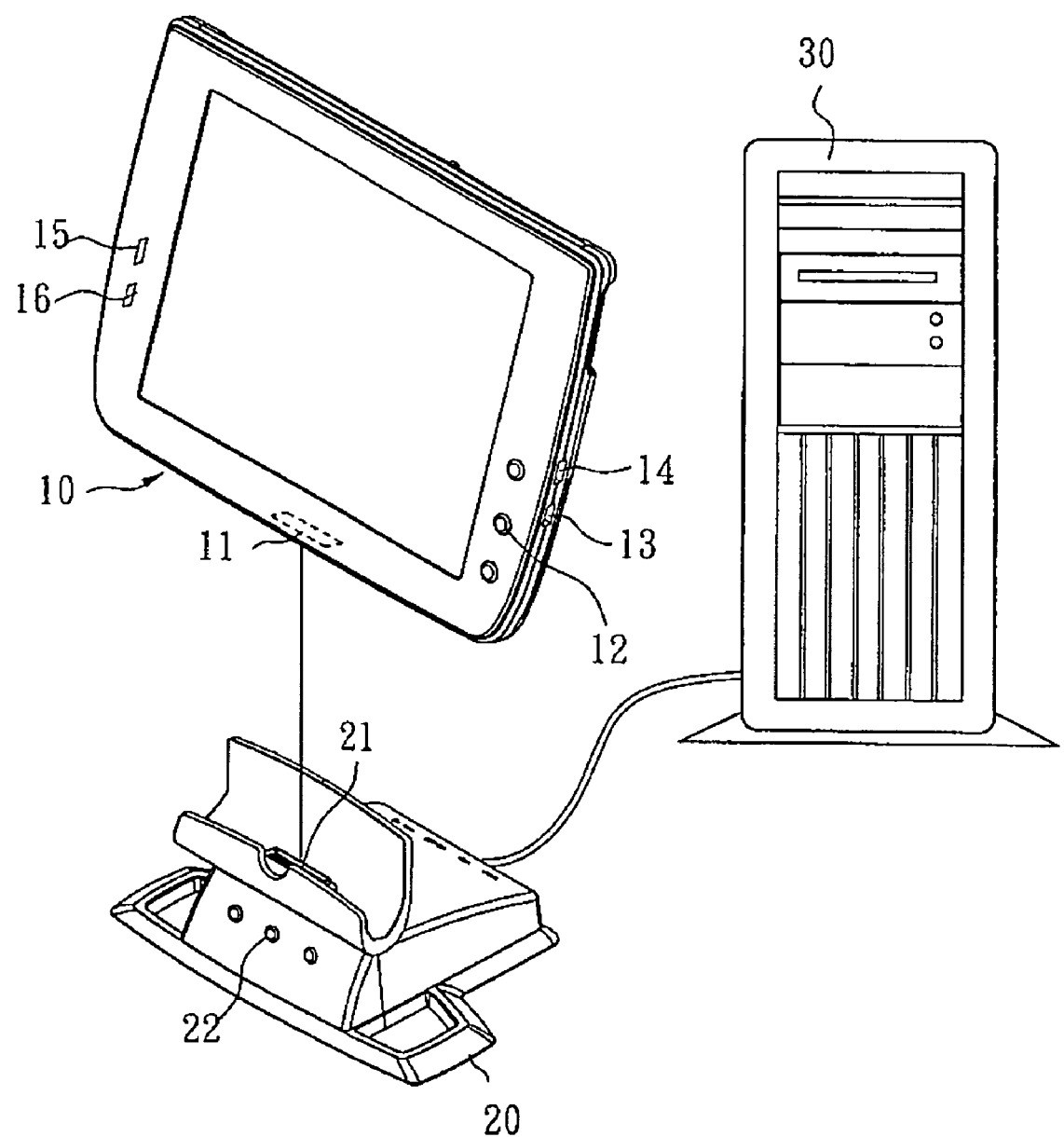
FIG. 1 is a schematic view showing the portable apparatus and the connection pedestal of the prior art.
Figure 2:
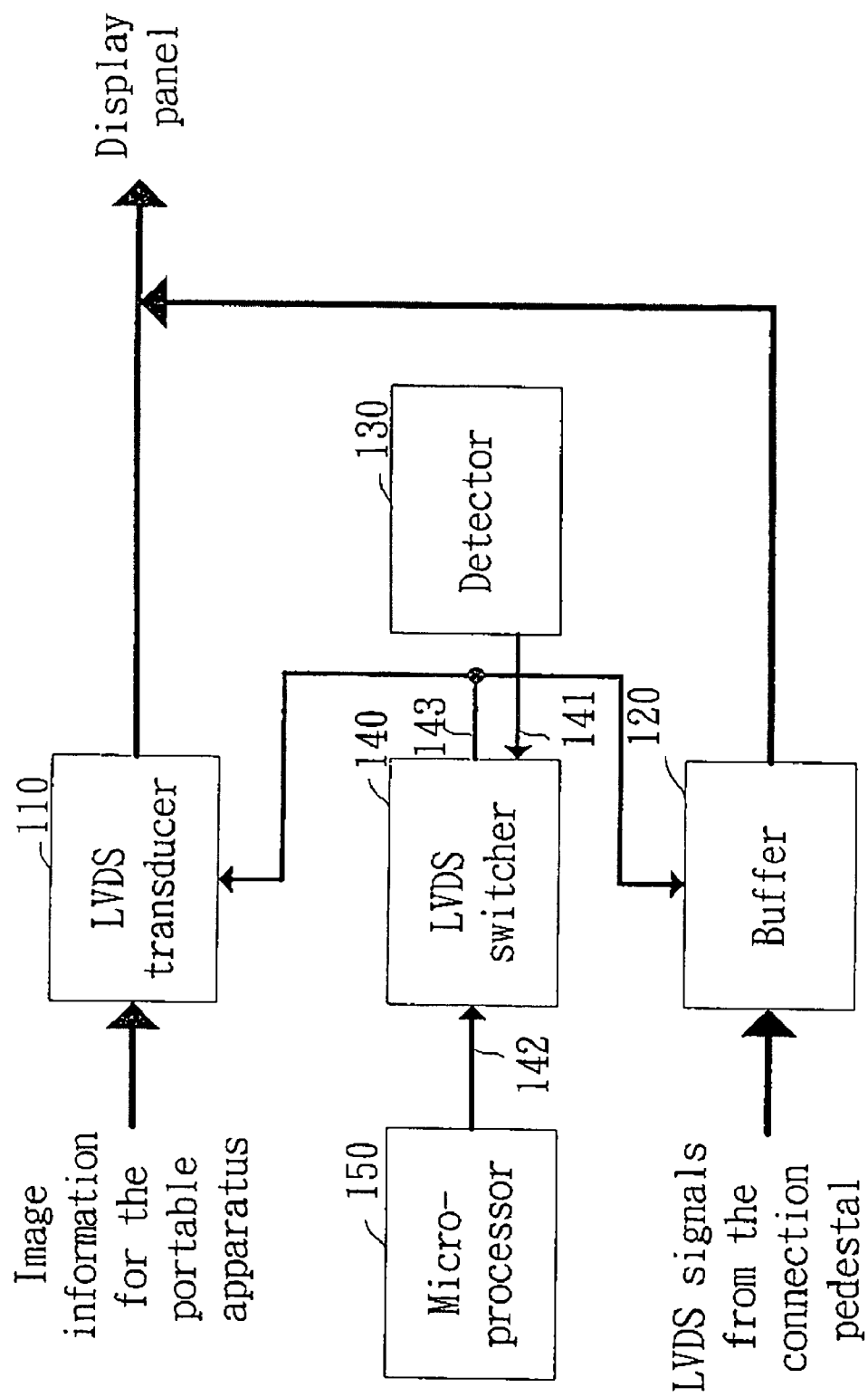
FIG. 2 is a block diagram showing the circuit of the LVDS switch control device of the present invention.

With reference to FIG. 2, there is a block diagram showing the circuit of the LVDS switch control device of the present invention. The LVDS switch control device includes an LVDS transducer 110, a buffer 120, a detector 130, and an LVDS switcher 140. The LVDS transducer 110 transforms image information for the portable apparatus into LVDS signals in order to drive the display panel of the portable apparatus and to display graphs or images coded in the image information on the display panel. The detector 130 produces a correct assembling signal as the portable apparatus is correctly inserted or assembled on the connection pedestal.

The buffer 120 prevents the impedance mismatching problem caused by a too-long distance between the LVDS transducer 110 and the connector 11 when the portable apparatus is not inserted or not assembled on the connection pedestal. On the other hand, the buffer 120 receives the LVDS signals transmitted by the connection pedestal when the portable apparatus is well mounted on the connection pedestal. Therefore, when the mainframe transmits streams of video/sound signals and thus requires a wider bandwidth, the connection pedestal can transmit the LVDS signals and thereby display graphs or images coded in the image information on the display panel of the portable apparatus successfully.

The LVDS switcher 140 has a first input end 141, a second input end 142 and an output end 143. The first input end 141 connects the detector 130. When the portable apparatus is inserted or mounted to the pedestal, the detector will detect whether the portable apparatus is correctly inserted on or mounted with the pedestal. When the portable apparatus is correctly inserted on or mounted on the pedestal, the detector 130 produces a correct assembly signal, and the output end 143 of the LVDS switcher 140 produces a signal to disable the LVDS transducer 110 and to enable the buffer 120 so that the LVDS signals outputted by the connection pedestal can be transmitted to the display panel of the portable apparatus.

Figure 3:
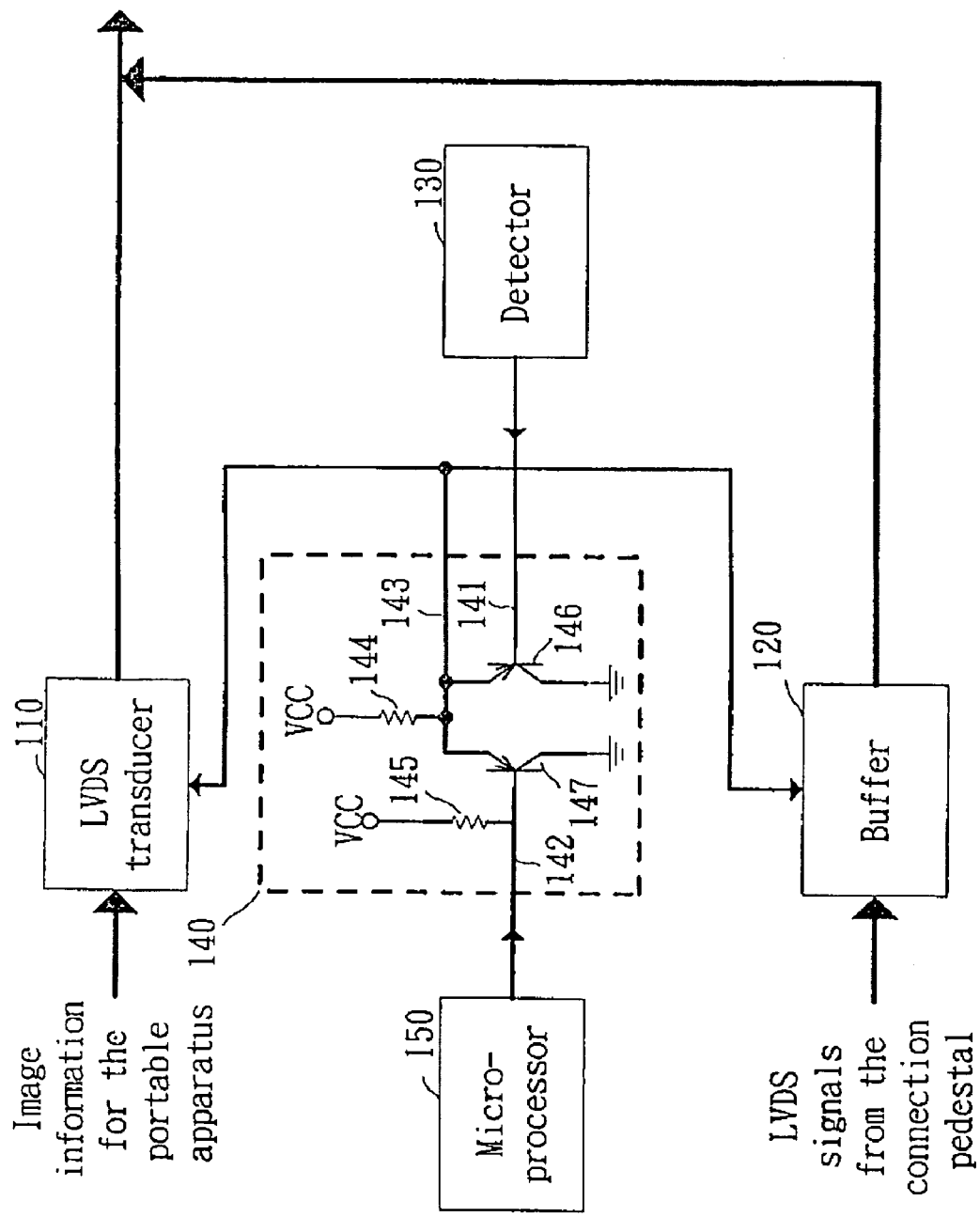
FIG. 3 is a circuit diagram of the LVDS switcher of an embodiment of the present invention.

With reference to FIG. 3, there is shown a circuit diagram of the LVDS switcher 140 of the present invention. The LVDS switcher 140 includes a first resistor 144, a second resistor 145, a first transistor 146, and a second transistor 147. Both the first transistor 146 and the second transistor 147 are PNP transistors. The gate of the first transistor 146 is coupled to the first input end 141 of the LVDS switcher 140, and the drain of the first transistor 146 is coupled to a first low potential. Further, the source of the first transistor 146 is coupled to a first end of the first resistor 144, the source of the second transistor 147 and the output end 143 of the LVDS switcher 140. In addition, the second end of the first resistor 144 is coupled to a first high potential, and the drain of the second transistor 147 is coupled to a second low potential. Furthermore, the gate of the second transistor 147 is coupled to the second input end 142 of the LVDS switcher 140 and a first end of the second resistor 145. Besides, the second end of the second resistor 145 is coupled to a second high potential.

When the portable apparatus is correctly assembled or inserted on the connection pedestal, the detector 130 produces a correct assembly signal (i.e. a low potential), the first transistor 146 of the LVDS switcher 140 is turned on, and therefore the output end 143 is at a low potential. As a result, the LVDS transducer 110 is disabled and the buffer 120 is enabled so that the LVDS signals outputted by the connection pedestal are transmitted to the display panel of the portable apparatus.

Moreover, one pin of the microprocessor 150 is coupled to the second input end 142 of the LVDS switcher 140. When the portable apparatus is not assembled or inserted on the connection pedestal, the detector 130 does not produce a correct assembly signal, and therefore, the first transistor 146 of the LVDS switcher 140 is off, and the microprocessor 150 can produce a high potential at the second input end 142 of the LVDS switcher 140 by the pin and turn off the second transistor 147. As a result, the output end 143 is at a high potential, and thereby the LVDS transducer 110 is enabled and the buffer 120 is disabled. Consequently, the impedance mis-matching problem caused by a too-long distance between the LVDS transducer 110 and the connector 11 is prevented. Also, the LVDS signals transformed from the image information of the portable apparatus are transmitted to the display panel successfully.

Similarly, the microprocessor 150 can produce a low potential at the second input end 142 of the LVDS switcher 140 by the pin. Consequently, the second transistor 147 of the LVDS switcher 140 is turned on, the potential of the output end 143 thus becomes a low potential, and the LVDS transducer 110 is disabled. Therefore, the object of controlling the LVDS switcher 110 with single software is achieved.

From the illustration mentioned above, the present invention uses the LVDS switcher 140 to control the transmitting of the LVDS signals transformed from the image information for the portable apparatus or outputted by the connection pedestal to the display panel of the portable apparatus. Also, a software procedure may be used to control the LVDS transducer 110.

Although the present invention has been explained in relation to its preferred embodiment, it is to be understood that many other possible modifications and variations can be made without departing from the spirit and scope of the invention as hereinafter claimed.

What is claimed is:

1. An LVDS switch control device for a portable apparatus, comprising:
   an LVDS transducer, which transforms an image information for the portable apparatus into LVDS signals;
   a buffer for preventing the impedance mismatching problem caused by too long a distance between the LVDS transducer and a connection pedestal as the portable apparatus is not assembled on the connection pedestal, and receiving the LVDS signals transmitted by the connection pedestal as the portable apparatus is assembled on the connection pedestal;
   a detector producing a correct assembling signal as the portable apparatus is correctly assembled on the connection pedestal; and
   an LVDS switcher having a first input end, a second input end and an output end, wherein the first input end connects the detector;
   wherein when the detector produces the correct assembling signal, the output end of the LVDS switcher will produce a signal that disables the LVDS transducer and enables the buffer so that the LVDS signals outputted by the connection pedestal will be transmitted to a display panel of the portable apparatus.

2. The LVDS switch control device as claimed in claim 1, wherein the LVDS switcher has a first resistor, a second resistor, a first transistor and a second transistor, the gate of the first transistor is coupled to the first input end of the LVDS switcher, the drain of the first transistor is coupled to a first low potential, the source of the first transistor is coupled to a first end of the first resistor and the source of the second transistor, the second end of the first resistor is coupled to a first high potential, the drain of the second transistor is coupled to a second low potential, the gate of the second transistor is coupled to the second input end of the LVDS switcher and a first end of the second resistor, and the second end of the second resister is coupled to a second high potential.

3. The LVDS switch control device as claimed in claim 2, further comprising a microprocessor, of which a pin is coupled to the second input end of the LVDS switcher, wherein the microprocessor produces a high potential at the pin to enable the LVDS switcher and to disable the buffer when the detector does not produce the correct assembling signal, so that the image information of the portable apparatus is transformed into LVDS signals, which are subsequently transmitted to the display panel of the portable apparatus.

4. The LVDS switch control device as claimed in claim 2, wherein the first transistor and the second transistor are PNP transistors.

* * * * *